US012366171B2

(12) United States Patent
Raghuvaran et al.

(10) Patent No.: US 12,366,171 B2
(45) Date of Patent: Jul. 22, 2025

(54) FAN ASSEMBLIES WITH FAN DISK INSERTS AND METHODS OF ASSEMBLING THE SAME

(71) Applicant: General Electric Company, Schenectady, NY (US)

(72) Inventors: Vaishnav Raghuvaran, Bangalore (IN); Bhaskar Nanda Mondal, Bangalore (IN); Gary W. Bryant, Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/202,506

(22) Filed: May 26, 2023

(65) Prior Publication Data

US 2024/0392690 A1 Nov. 28, 2024

(51) Int. Cl.
*F01D 5/30* (2006.01)
*F01D 5/02* (2006.01)

(52) U.S. Cl.
CPC ........... *F01D 5/3007* (2013.01); *F01D 5/021* (2013.01); *F05D 2220/36* (2013.01); *F05D 2240/24* (2013.01); *F05D 2250/712* (2013.01)

(58) Field of Classification Search
CPC .... F01D 5/021; F01D 5/3007; F05D 2220/36; F05D 2240/24; F05D 2250/712
See application file for complete search history.

(56) References Cited

U.S. PATENT DOCUMENTS

| | | | | |
|---|---|---|---|---|
| 2,810,544 | A | 10/1957 | Schorner | |
| 2,873,947 | A * | 2/1959 | Perry | F01D 5/3007 416/214 A |
| 3,807,895 | A | 4/1974 | McMurtry | |
| 4,111,603 | A * | 9/1978 | Stahl | F01D 5/3084 416/193 A |
| 5,213,475 | A * | 5/1993 | Peterson | F01D 5/3007 416/244 A |
| 5,222,865 | A * | 6/1993 | Corsmeier | F01D 5/3007 416/193 A |
| 8,651,820 | B2 | 2/2014 | Krikunov et al. | |
| 8,708,656 | B2 * | 4/2014 | Barnett | F01D 5/3007 416/248 |
| 10,072,508 | B2 * | 9/2018 | Beaujard | F01D 5/3084 |
| 10,480,333 | B2 | 11/2019 | Molony et al. | |
| 10,633,986 | B2 | 4/2020 | Sippel et al. | |
| 10,641,111 | B2 | 5/2020 | Sippel et al. | |
| 10,655,479 | B2 * | 5/2020 | Sippel | F01D 5/3007 |
| 11,156,111 | B2 | 10/2021 | Sippel et al. | |
| 2020/0392856 | A1 * | 12/2020 | McCaffrey | F01D 5/081 |
| 2021/0324750 | A1 * | 10/2021 | Kurashima | F01D 5/30 |

FOREIGN PATENT DOCUMENTS

| | | |
|---|---|---|
| CN | 111365079 A | 7/2020 |

* cited by examiner

*Primary Examiner* — Sang K Kim
(74) *Attorney, Agent, or Firm* — Dinsmore & Shohl LLP

(57) ABSTRACT

A fan assembly for an engine includes a fan disk, fan disk inserts, and fan blades. The fan disk includes disk posts extending in a radial direction from a central region of the fan disk. The disk posts include disk post pressure surfaces that define a first array of dovetail recesses. The fan disk inserts are retained within the first array of dovetail recesses. The fan disk inserts include fan disk insert pressure surfaces that define a second array of dovetail recesses. The fan blades are retained within the second array of dovetail recesses.

12 Claims, 7 Drawing Sheets

FAN ASSEMBLIES WITH FAN DISK INSERTS AND METHODS OF ASSEMBLING THE SAME

TECHNICAL FIELD

The present specification generally relates to engines, fan assemblies for engines, methods of assembling the same, and, more particularly, to such engines, fan assemblies for engines, and methods including fan disk inserts.

BACKGROUND

Many engines include a fan assembly operably coupled to a turbine assembly. The fan assembly may include a fan disk and an array of fan blades that extend radially outward from the fan disk. During engine operation, the fan assembly may be rotated such that the fan blades rotate about a central axis. This rotation imparts a centrifugal force on the fan blades, which is transferred to the fan disk, resulting in stresses acting on the fan disk. In particular, the stresses on the fan disk may be highest at the disk neck, or the thinnest portion of the fan disk.

In the event that a fan blade is wholly or partially removed during engine operation (i.e. a "fan blade out event") and no longer functioning within acceptable limits, the forces acting on the fan disk may be suddenly disrupted, causing a bending moment about the disk neck. Accordingly, the disk neck must be sized and positioned to withstand such forces and such bending moments.

In order to decrease the forces and bending moments that may act on the disk neck, the radius of the disk neck (e.g. the distance between the disk neck and the centerline of the engine) may be increased. However, as the radius of the disk neck is increased, the efficiency of the engine decreases.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

DETAILED DESCRIPTION

Figure 1:
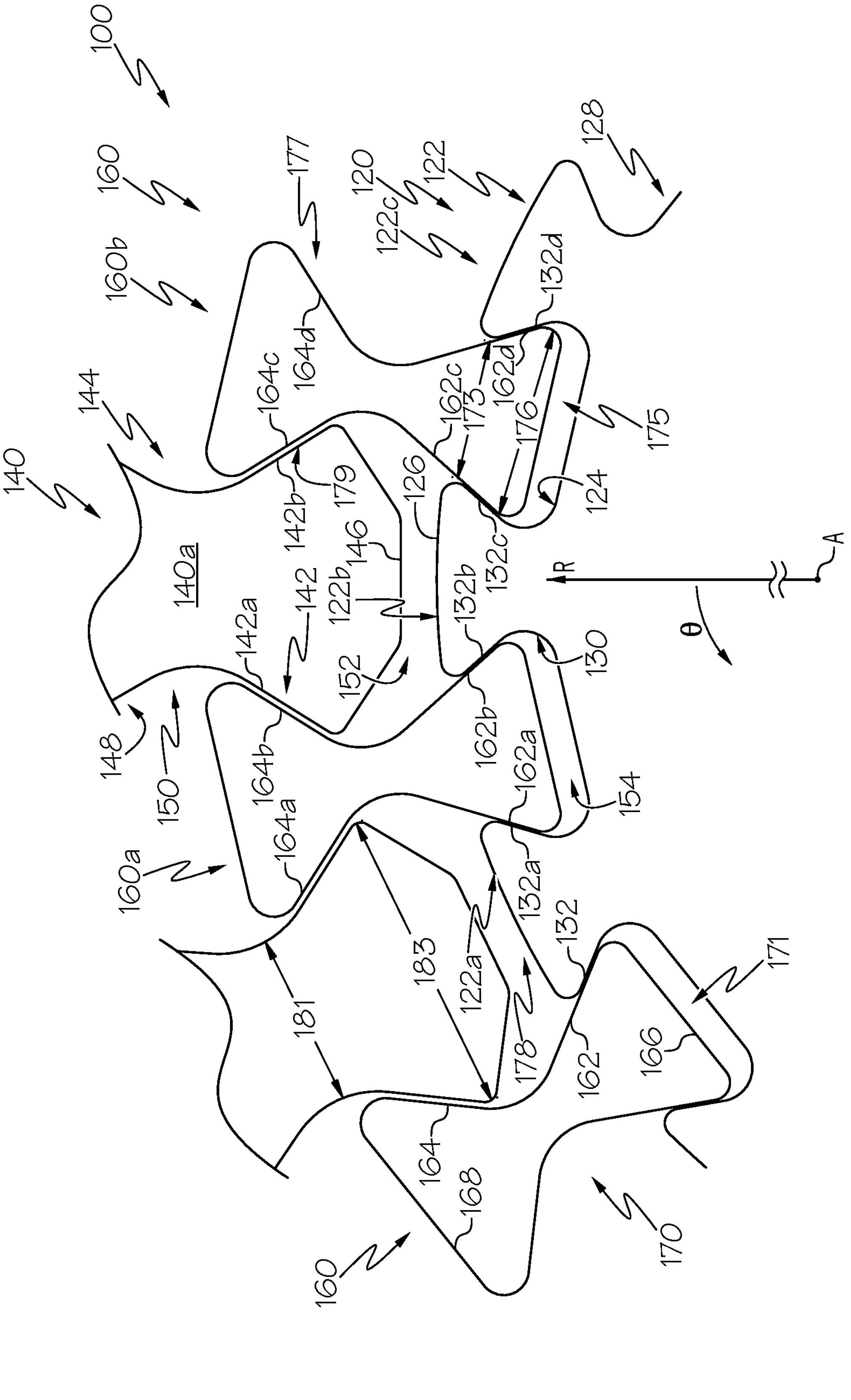
FIG. 1 schematically depicts a partial cross section of a fan assembly taken normal to the axial direction, according to one or more embodiments shown and described herein.

Reference will now be made in detail to various embodiments of devices, assemblies, and methods, examples of which are illustrated in the accompanying drawings. Whenever possible, the same reference numerals will be used throughout the drawings to refer to the same or like parts. FIG. 1 schematically depicts a fan assembly that may generally include a fan disk, fan disk inserts, and fan blades. The fan disk may include disk posts extending in a radial direction from a central region of the fan disk. The disk posts may include disk post pressure surfaces that define a first array of dovetail recesses. The fan disk inserts may be retained within the first array of dovetail recesses. The fan disk inserts may include fan disk insert pressure surfaces that define a second array of dovetail recesses. The fan blades may be retained within the second array of dovetail recesses. In embodiments, the fan disk inserts may move in accordance with rigid body motion in the event of a fan blade out. Accordingly, the fan disk inserts may decrease bending loads experienced by the fan assembly during such an event.

It should be noted that while a fan rotor disk (i.e., fan disk) is described below, the disk posts with insert receiving slots and disk post inserts may be used with rotor disks of compressor assemblies and turbine assemblies of gas turbine engines. The term "blade" is intended to broadly include any radial aerofoil mounted in any of the fan assembly, turbine assembly and compressor assembly including a fan blade, turbine blade and compressor blade and connectable to a rotor disk.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms “a,” “an,” and “the” include plural referents unless the context clearly dictates otherwise. Thus, for example, reference to “a” component includes aspects having two or more such components, unless the context clearly indicates otherwise.

Referring to FIG. 1, an embodiment of a portion of a fan assembly 100 is schematically depicted. In embodiments, the fan assembly 100 may be included within an engine and operably coupled to and rotated by a turbine assembly (not depicted). Accordingly, during engine operation, the fan assembly 100 may rotated about the axial direction A of the depicted cylindrical coordinate system. The fan assembly 100 may include a fan disk 120 that may retain a fan blade 140. The fan disk 120 may include a plurality of disk posts 122, such as a first disk post 122*a*, a second disk post 122*b*, and a third disk post 122*c*. The disk posts 122 may be evenly spaced circumferentially about rotational support means formed as a central region, represented by element, 128 of a disk body (also represented by element 128) of the fan disk 120.

Each of the disk posts 122 may extend radially outward from the central region 128 (e.g. in the R direction of the depicted cylindrical coordinate system) such that they define an attachment region 124 at the central region 128 of the fan disk 120 and a radially outer surface 126 disposed radially outward of the attachment region 124. The radially outer surface 126 may be the outermost surface of the disk posts 122 in the radial direction (e.g. in the R direction of the depicted cylindrical coordinate system). Disposed radially inward of the radially outer surface 126 may be a disk post neck 130. As depicted, the disk post neck 130 may be narrower than the attachment region 124 and the radially outer surface 126. Each of the disk posts 122 may define disk post pressure surfaces 132, such as the depicted disk post pressure surfaces 132*a*, 132*b*, 132*c*, and 132*d*. The disk post pressure surfaces 132 may extend at an angle θ to the radial direction R. The disk post pressure surfaces 132 may be disposed between the disk post neck 130 and the radially outer surface 126, such as depicted.

Still referring to FIG. 1, the fan assembly 100 may include fan blades 140. The fan blades 140 may each include a dovetail region 144 extending radially inward from a blade portion 148 (not wholly depicted in FIG. 1). The dovetail region 144 may define a radially inner surface 146. The radially inner surface 146 may be the innermost surface of the fan blades 140 in the radial direction (e.g., in the R direction of the depicted cylindrical coordinate system). Disposed radially outward of the radially inner surface 146 may be a fan blade neck 150. As depicted, the fan blade neck 150 may be narrower than the blade portion 148 and the radially inner surface 146. The dovetail region 144 may define fan blade pressure surfaces 142 disposed at an angle to the radial direction R. For example, a fan blade 140*a* of the fan blades 140 may have a first pressure surface 142*a* and a second pressure surface 142*b*, each disposed at an angle to the radial direction R.

Still referring to FIG. 1, the fan assembly 100 may include fan disk inserts 160, such as a first fan disk insert 160*a* and a second fan disk insert 160*b*. Each of the fan disk inserts 160 may extend from a radially inner surface 166 to a radially outer surface 168. Each of the fan disk inserts 160 may have inner pressure surfaces 162 and outer pressure surfaces 164. For example, the first fan disk insert 160*a* may have an outer pressure surface 164*a*, an outer pressure surface 164*b*, an inner pressure surface 162*a*, and an inner pressure surface 162*b*. Similarly, the second fan disk insert 160*b* may have an outer pressure surface 164*c*, an outer pressure surface 164*d*, an inner pressure surface 162*c*, and an inner pressure surface 162*d*. Each of the inner pressure surfaces 162 and the outer pressure surfaces 164 may be oriented at an angle to the radial direction R. In particular, the inner pressure surfaces 162 may be oriented at the same angle as the disk post pressure surfaces 132. The outer pressure surfaces 164 may be oriented at the same angle as the fan blade pressure surfaces 142. In this way, the inner pressure surfaces 162 may engage the disk post pressure surfaces 132 in operation, and the outer pressure surfaces 164 may engage the fan blade pressure surfaces 142 in operation. Each of the outer pressure surfaces 164 and the inner pressure surfaces 162 may be disposed between the radially inner surface 166 and the radially outer surface 168. Disposed between the outer pressure surfaces 164 and the inner pressure surfaces 162 may be a fan disk insert neck 170. The fan disk insert neck 170 may be more narrow than the radially inner surface 166 and the radially outer surface 168, thereby giving each of the fan disk inserts 160 a hourglass cross sectional shape. In embodiments, edges of the outer pressure surfaces 164 and the inner pressure surfaces 162 may be curved or chamfered to reduce stress concentrations within the fan disk inserts 160.

As shown in FIG. 1, the disk posts 122 are spaced apart in the circumferential direction to provide a first array of dovetail recesses 171 between adjacent disk posts 122. Due to the orientations of the disk post pressure surfaces 132 to the radial direction, the dovetail recesses 171 increase in circumferential dimension from a recess opening 173 through which the fan disk inserts 160 extend to the central region 128. The fan disk inserts 160 are partially received within the dovetail recesses 171 such that the fan disk insert necks 170 pass through the recess openings 173. In particular, each fan disk insert 160 defines an inner dovetail portion 175 and an outer dovetail portion 177 that are connected by the fan disk insert neck 170. The inner dovetail portion 175 decreases in circumferential dimension moving from the radially inner surface 166 to the fan disk insert neck 170 in a fashion that corresponds to the cross sectional shape of the dovetail recesses 171. The greatest circumferential dimension (represented by arrow 176) of the inner dovetail portion 175 is greater than the circumferential dimension of the recess opening 173 such that the inner dovetail portions 175 are retained within their respective dovetail recesses 171 during operation, as will be described below.

The fan disk inserts 160 are spaced apart in the circumferential direction to provide a second array of dovetail recesses 179 between adjacent outer dovetail portions 175 of the fan disk inserts 160. Due to the orientations of the outer pressure surfaces 164 to the radial direction, the dovetail recesses 179 increase in circumferential dimension from a recess opening 181 through which the dovetail region 144 of the fan blades 140 extend to the fan disk insert neck 170. The dovetail regions 144 are partially received within the dovetail recesses 179 such that the dovetail regions 144 pass through the recess openings 181. The inner dovetail portion 175 increases in circumferential dimension moving from the fan disk insert neck 170 to the radially inner surface 166 in a fashion that corresponds to the cross sectional shape of the dovetail regions 144. The greatest circumferential dimension (represented by arrow 183) of the dovetail region 144 is greater than the circumferential dimension of the recess opening 181 such that the dovetail regions 144 are retained within their respective dovetail recesses 179 during operation.

The fan disk inserts 160 may be made from a composite, a metal, or a metal alloy such as titanium, titanium alloy, nickel, nickel alloy, iron, iron alloy, shape memory materials and the like. In some embodiments, the fan disk inserts 160 may be made from the same material as the fan disk 120. In other embodiments, the fan disk inserts 160 may be made from a different material than the fan disk 120.

In light of FIG. 1, it will now be appreciated that the fan disk inserts 160 may be inserted into the first array of dovetail recesses 171 and the fan blades 140 may be inserted into the second array of dovetail recesses 179. As depicted, the fan blade 140*a* may be circumferentially aligned with the second disk post 122*b* (e.g. in the +/−θ direction of the depicted cylindrical coordinate system) such that the radially inner surface 146 faces the radially outer surface 126.

During engine operation, as the fan disk 120 is rotated, the fan disk inserts 160 and the fan blades 140 will also rotate. The rotation of the fan blades 140 may impart a centrifugal force, which will be transferred from the fan blades 140 to the fan disk inserts 160 and to the disk posts 122 due to the cooperating engagement of the outer dovetail portions 177 with the dovetail regions 144 and the cooperating engagement of the inner dovetail portions 175 with the disk posts 122. The centrifugal force may cause the fan blades 140 and the fan disk inserts 160 to move to the radially outermost position, such as depicted in FIG. 1. Accordingly, as depicted, the fan blade 140*a* may be radially offset from the second disk post 122*b* such that a fan blade gap 152 may be disposed between the fan blade 140*a* and the second disk post 122*b*. Additionally, when in the radially outermost position, such as depicted in FIG. 1, the fan blade pressure surfaces 142 may engage the outer pressure surfaces 164 of the fan disk inserts 160.

In a similar manner, when in the radially outermost position, such as depicted in FIG. 1, the fan disk inserts 160 may be radially offset from the central region 128 of the fan disk 120. Accordingly, a fan disk insert gap 154 may be disposed between the fan disk inserts 160 and the central region 128 of the fan disk 120. Additionally, when in the radially outermost position, such as depicted in FIG. 1, the inner pressure surfaces 162 of the fan disk inserts 160 may be engaged against the disk post pressure surfaces 132.

In light of FIG. 1, in a fan blade out event involving a whole or partial removal of the fan blade 140*a*, the centrifugal forces acting on the fan assembly 100 may be unbalanced, centrifugal forces imparted by the fan blade 140*a* may be greatly decreased. Accordingly, the centrifugal forces acting on the outer pressure surface 164*b* and the outer pressure surface 164*c* may be decreased. However, the centrifugal forces acting on the outer pressure surfaces 164*a* and the outer pressure surface 164*d* may remain at the same magnitude. This change in centrifugal forces and resulting imbalance may induce a bending moment on the fan assembly 100.

As an example, when the force acting on the outer pressure surface 164*b* is decreased, the first fan disk insert 160*a* may rotate toward the outer pressure surface 164*b*. In other words, the first fan disk insert 160*a* may rotate in the +θ direction of the depicted cylindrical coordinate system. As the first fan disk insert 160*a* rotates, the inner pressure surface 162*a* may slide upward relative to the disk post pressure surface 132*a* (e.g. in the +R direction of the depicted cylindrical coordinate system). In a similar manner, the inner pressure surface 162*b* may slide downward relative to the disk post pressure surface 132*b* (e.g. in the −R direction of the depicted cylindrical coordinate system). Because the inner pressure surfaces 162*a* and 162*b* may slide relative to the disk post pressure surfaces 132*a* and 132*b*, thereby adjusting an angular position of the first fan disk insert 160*a*, the first fan disk insert 160*a* may experience reduced bending loads and may move in accordance with rigid body motion.

When the force acting on the outer pressure surface 164*c* is decreased, the second fan disk insert 160*b* may rotate toward the outer pressure surface 164*c*. In other words, the second fan disk insert 160*b* may rotate in the −θ direction of the depicted cylindrical coordinate system. The inner pressure surface 162*c* may slide downward relative to the disk post pressure surface 132*c*, and the inner pressure surface 162*d* may slide upward relative to the disk post pressure surface 132*d*. Because the inner pressure surfaces 162*c* and 162*d* may slide relative to the disk post pressure surfaces 132*c* and 132*d*, the second fan disk insert 160*b* may experience reduced bending loads due to the angular adjustment and may move in accordance with rigid body motion.

When the first fan disk insert 160*a* rotates in the +θ direction of the depicted cylindrical coordinate system, such as described, the outer pressure surface 164*b* may each exert a downward force on the fan blade pressure surface 142*a* (e.g. in the −R direction of the depicted cylindrical coordinate system). Similarly, when the second fan disk insert 160*b* rotates in the −θ direction of the depicted cylindrical coordinate system, such as described, the outer pressure surface 164*c* may exert a downward force on the fan blade pressure surface 142*b*. Accordingly, fan blade 140 may move downward (e.g. in the −R direction of the depicted cylindrical coordinate system). In particular, in some embodiments, the movement of the fan blades 140 downward may eliminate the gap 152 and the fan blade 140 may seat against the radially outer surfaces 126.

As will now be appreciated, in light of FIG. 1, during a fan blade out event, each of the fan disk inserts 160 may rotate in accordance with rigid body motion. Accordingly, the fan disk inserts 160 may experience reduced bending stresses both during a fan blade out event and during standard operation. Additionally, each of the fan disk inserts 160 may be in slidable contact with the disk posts 122. Because of this freedom of movement, the bending movement applied to the disk posts 122 may be decreased as compared to conventional fan disk designs. Accordingly, the bending stresses experienced by the disk posts 122 may be similarly decreased. It is noted that, even in embodiments where movement of the fan disk inserts 160 is not wholly in accordance with rigid body motion, the bending stresses in the disk posts 122 and the fan disk inserts 160 may still be decreased as compared to conventional fan disk designs. Due to the decreased bending stresses in the disk posts 122 and the fan disk inserts 160, as compared to conventional fan disk designs, the radial positions of the disk posts 122, the fan disk inserts 160, and, correspondingly, the dovetail region 144 may be decreased. This may increase the overall efficiency of the fan assembly 100 and, more broadly, the engine in which the fan assembly 100 is included.

Additionally or alternatively, due to the decreased bending stresses in the disk posts 122 and the fan disk inserts 160, as compared to conventional fan disk designs, the materials of the disk posts 122 and/or the fan disk inserts 160 may not need to have as high bending strength. Accordingly, this may enable the use of lighter materials for the disk posts 122 and/or the fan disk inserts 160, such as high strength steel alloys and shape memory materials compared to the disk material, such as titanium alloys. This may decrease the overall weight of the fan assembly 100.

In other embodiments, the materials of the fan disk inserts 160 may have a higher bending strength and/or higher density than conventional disk materials. This may enable the disk posts 122 and/or the fan disk inserts 160 to experience higher bending stresses without decreasing the life of the fan assembly 100. More specifically, this may enable the disk posts 122 and the fan disk inserts 160 to be positioned at a smaller radius which may increase the efficiency of the fan assembly 100.

Figure 2:
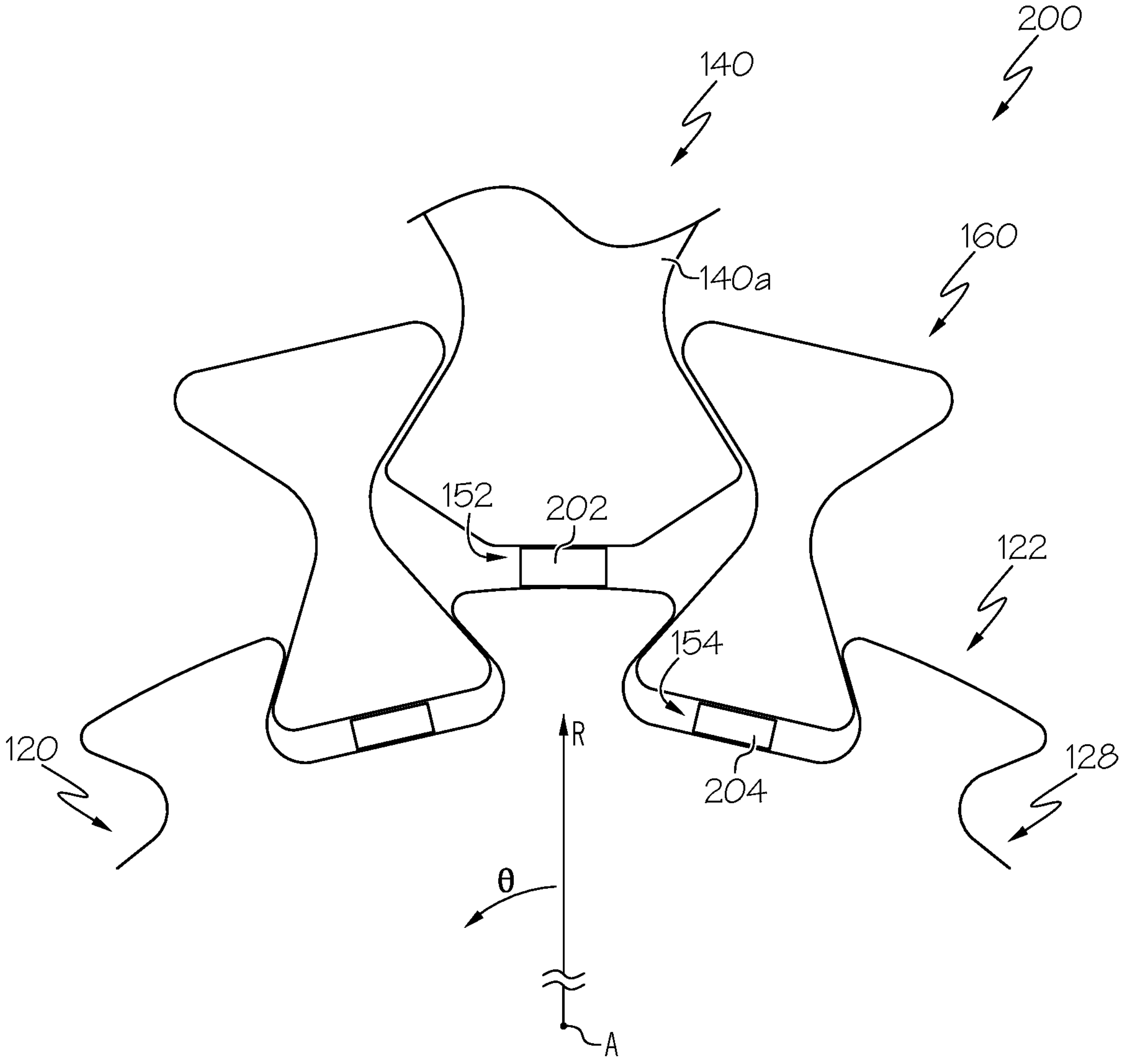
FIG. 2 schematically depicts a partial cross section of another fan assembly taken normal to the axial direction, according to one or more embodiments shown and described herein.

Referring now to FIG. 2, an embodiment of a fan assembly 200 is schematically depicted. The fan assembly 200 is similar to the fan assembly 100. Accordingly, like numbers will be used to refer to like features. For example, the fan assembly 200 may include a fan disk 120 that may include disk posts 122 radially extending from a central region 128. The fan assembly 200 may include fan blades 140 and fan disk inserts 160. Disposed between the fan blades 140 and the disk posts 122 may be a fan blade gap 152, such as described hereinabove. Within the fan blade gap 152, the fan assembly 200 may include a first spacer 202. In embodiments, the first spacer 202 may abut the fan blades 140 and the disk posts 122, such as depicted. In other embodiments, the first spacer 202 may be radially offset from the fan blades 140 and/or the disk posts 122. The first spacer 202 may have a rectangular cross section, such as depicted. However, other cross sectional shapes are contemplated and possible. For example, the first spacer 202 may be trapezoidal or may have any angular, rounded, regular, or irregular shape. The first spacer 202 may be made from any appropriate metal, metal alloy, or composite material. In some embodiments, the first spacer 202 may be made of a material with a lower yield strength (e.g., lower than 1050 MPa) than the fan blades 140 or the fan disk 120. In some embodiments, the first spacer 202 may be made of a material with a lower density (e.g., less than 8 g/cm$^3$) than the fan blades 140 or the fan disk 120.

Disposed between the fan disk inserts 160 and the central region 128 of the fan disk 120, the fan assembly 200 may be a fan disk insert gap 154, such as describe hereinabove. Within the fan disk insert gap 154, the fan assembly 200 may include a second spacer 204. The second spacer 204 may have a rectangular cross section, such as depicted. In embodiments, the second spacer 204 may abut the fan disk inserts 160 and the central region 128 of the fan disk 120, such as depicted. In other embodiments, the second spacer 204 may be radially offset from the fan disk inserts 160 and/or the central region 128. However, other cross sectional shapes are contemplated and possible. For example, the second spacer 204 may be trapezoidal or may have any angular, rounded, regular, or irregular shape. The second spacer 204 may be made from any appropriate metal, metal alloy, or composite material. In some embodiments, the second spacer 204 may be made of a material with a lower yield strength than the fan disk inserts 160 or the fan disk 120. In some embodiments, the second spacer 204 may be made of a material with a lower density than the fan disk inserts 160 or the fan disk 120. The second spacer 204 may be made from the same material as the first spacer 202 or a different material than the first spacer 202.

In light of FIG. 2, during a fan blade out event of a fan blade 140*a*, the centrifugal forces acting on the fan assembly 200 may be disrupted. Accordingly, as described hereinabove, the fan disk inserts 160 may rotate (e.g. in the +/−θ direction of the depicted cylindrical coordinate system), and the fan blade 140*a* may move downward (e.g. in the −R direction of the depicted cylindrical coordinate system). During such movement, the fan blade 140*a* may compress the first spacer 202. The fan disk inserts 160 may compress the second spacer 204. The first spacer 202 and the second spacer 204 may therefore help distributed loading through the fan assembly 100. In some embodiments, the spacer 204 may fuse with the disk post inserts 160 during a blade out condition. This may decrease stress concentrations on the fan disk inserts 160 and the disk posts 122 during a fan blade out event.

Figure 3:
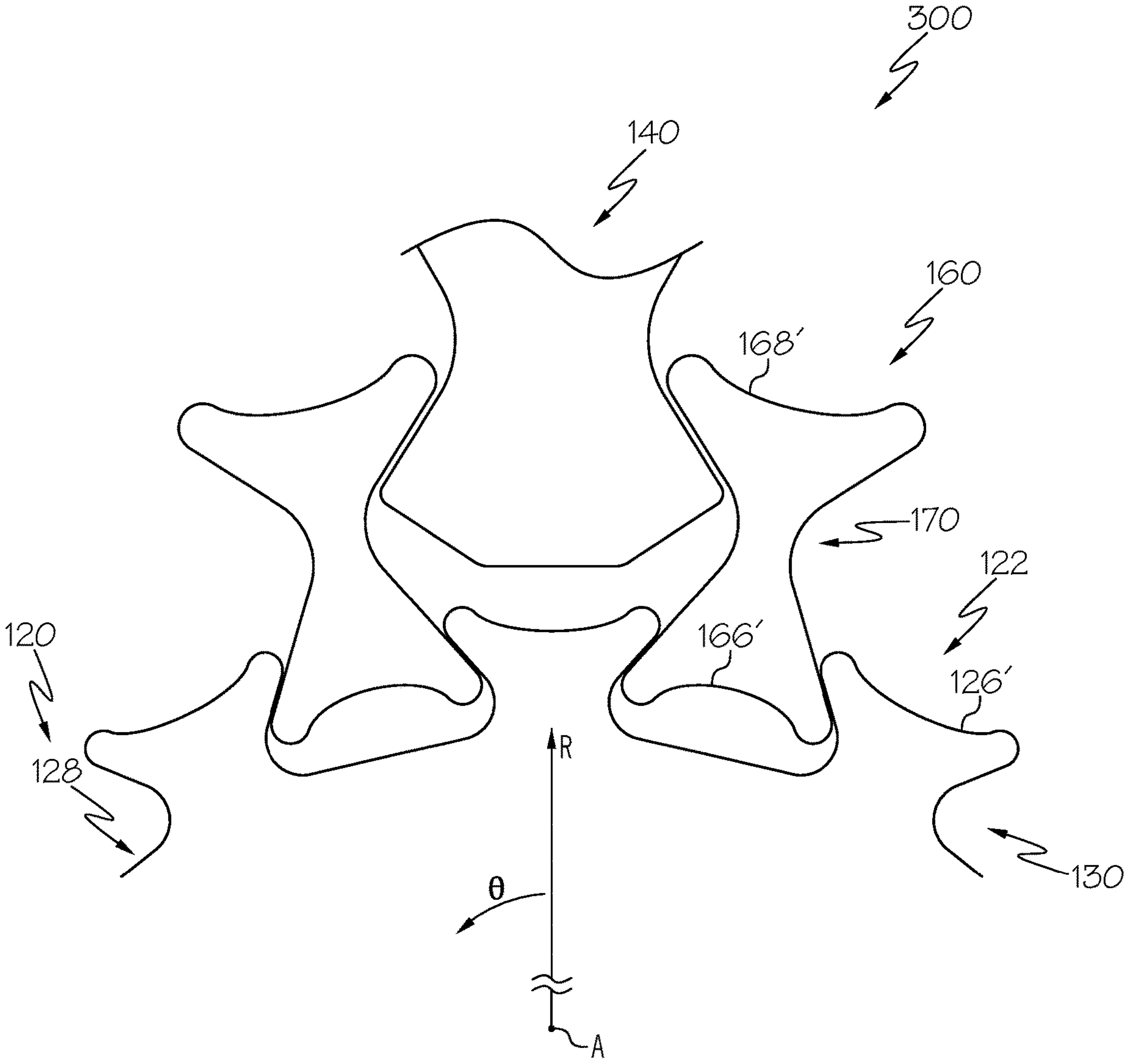
FIG. 3 schematically depicts a partial cross section of yet another fan assembly taken normal to the axial direction, according to one or more embodiments shown and described herein.

Referring now to FIG. 3, an embodiment of a fan assembly 300 is schematically depicted. The fan assembly 300 is substantially similar to the fan assemblies 100 and 200. Accordingly, like numbers will be used to refer to like features. For example, the fan assembly 300 may include a fan disk 120 that may include disk posts 122 radially extending from a central region 128. The fan assembly 300 may include fan blades 140 and fan disk inserts 160. The fan disk inserts 160 may extend from a radially inner surface 166' to a radially outer surface 168' and may have a fan disk insert neck 170 disposed therebetween. As depicted, the radially inner surface 166' and the radially outer surface 168' may each be concaved. As will be appreciated by those skilled in the art, the radially outer surface 168' and the radially inner surface 166' may be lower stress regions of the fan disk inserts 160 as compared to the stress seen in the fan disk insert neck 170 due to the increased circumferential width of the radially outer surface 168' and the radially inner surface 166' (e.g., at least twice the width, such as at least three times the width, such as at least four times the width, etc.) as compared to the fan disk insert neck 170. Accordingly, the concave shape of the radially outer surface 168' and the radially inner surface 166' may remove material from lower stress regions of the fan disk inserts 160. This may decrease the weight of the fan disk inserts 160 compared to having the material included without sacrificing necessary material strength of the fan disk inserts 160.

Still referring to FIG. 3, the disk posts 122 may have a radially outer surface 126'. The radially outer surface 126' may be concaved such as described with respect to the radially outer surface 168'. The radially outer surface 126' may be lower stress regions of the disk posts 122 as compared to the disk post neck 130 due to the increased circumferential of the radially outer surface 126' width as compared to the disk post neck 130. Accordingly, the concave shape of the radially outer surface 126' may remove material from a lower stress region of the disk posts 122. This may decrease the weight of the fan disk 120 without sacrificing necessary material strength of the disk posts 122.

Figure 4:
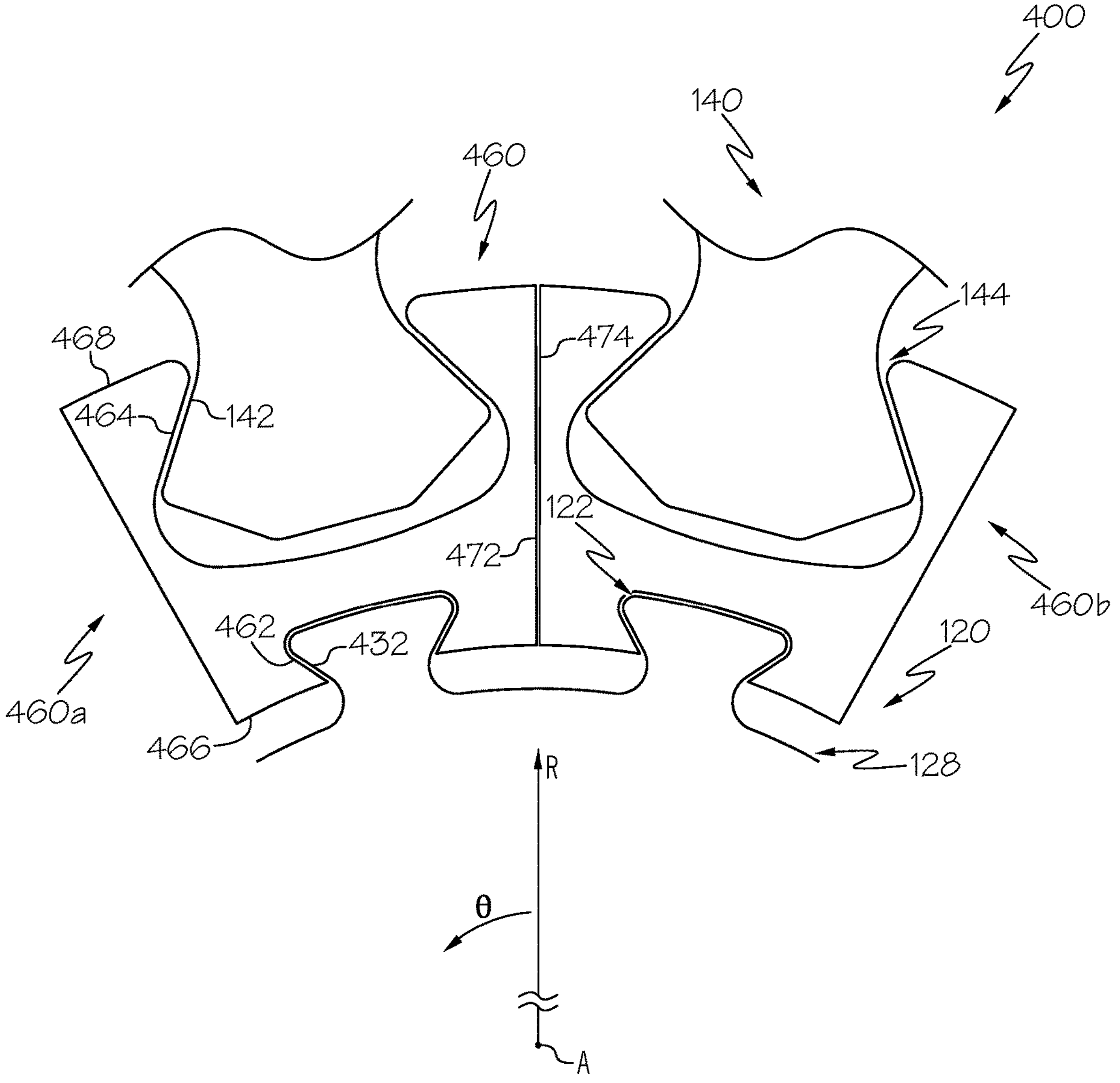
FIG. 4 schematically depicts a partial cross section of yet another fan assembly taken normal to the axial direction, according to one or more embodiments shown and described herein.

Referring now to FIG. 4, an embodiment of a fan assembly 400 is schematically depicted. Like numbers will be used to refer to like features. For example, the fan assembly 400 may include a fan disk 120 that may include disk posts 122 radially extending from a central region 128. The fan assembly 400 may include fan blades 140. The fan blades 140 may be circumferentially aligned with the disk posts 122, such as depicted. The disk posts 122 may have disk post pressure surfaces 132 such as described hereinabove. The fan blades 140 may have fan blade pressure surfaces 142 such as described hereinabove.

The fan assembly 400 may include fan disk inserts 460. The fan disk inserts 460 may be circumferentially aligned with the disk posts 122 and with the fan blades 140. The fan disk inserts 460 may extend from a radially inner surface

466 to a radially outer surface 468. The fan disk inserts 460 may have a first side surface 472 extending radially from the radially inner surface 466 to the radially outer surface 468 and a second side surface 474 extending radially from the radially inner surface 466 to the radially outer surface 468. When the fan assembly 400 is assembled, the first side surface 472 of a first fan disk insert 460*a* may engage and be in slidable contact with the second side surface 474 of a second fan disk insert 460*b*.

Still referring to FIG. 4, the fan disk inserts 460 may include outer pressure surfaces 464 and inner pressure surfaces 462. Each of the inner pressure surfaces 462 and the outer pressure surfaces 464 may be oriented at an angle to the radial direction R. In particular, the inner pressure surfaces 462 may be oriented at the same angle as the disk post pressure surfaces 132. The outer pressure surfaces 464 may be oriented at the same angle as the fan blade pressure surfaces 142. In this way, the inner pressure surfaces 462 may engage the disk post pressure surfaces 132 when assembled within the fan assembly 400, and the outer pressure surfaces 464 may engage the fan blade pressure surfaces 142 when assembled within the fan assembly 400.

Each of the outer pressure surfaces 464 and the inner pressure surfaces 462 may be disposed between the radially inner surface 466 and the radially outer surface 468. In particular, the outer pressure surfaces 464 may extend radially inward from the radially outer surface 468. The inner pressure surfaces 462 may extend radially outward from the radially inner surface 466. Accordingly, both the outer pressure surfaces 464 and the inner pressure surfaces 462 may define concave shapes. When the fan assembly 400 is assembled, the outer pressure surfaces 464 may engage and be in slidable contact with the fan blade pressure surfaces 142. The inner pressure surfaces 462 may engage and be in slidable contact with the disk post pressure surfaces 132.

In light of FIG. 4, during a fan blade out event, the fan disk inserts 460 may rotate circumferentially (e.g. in the +/−θ direction of the depicted cylindrical coordinate system). In particular, the fan disk inserts 460 may rotate in accordance with rigid body motion due to the slidable contact between the inner pressure surfaces 462 and the disk post pressure surfaces 132, between the outer pressure surfaces 464 and the fan blade pressure surfaces 142, and between the first side surface 472 of a first fan disk insert 460*a* and the second side surface 474 of a second fan disk insert 460*b*. The rigid body motion of the fan disk inserts 460 may decrease bending stresses throughout the fan assembly 400. As a result, as compared to conventional fan disk designs, the radial positions of the disk posts 122 and the dovetail region 144 of the fan blades 140 may be closer to the central region of the fan disk 120, which may increase the overall efficiency of the fan assembly 400 and, more broadly, the engine in which the fan assembly 400 is included. Further, unlike the fan disk inserts described above, each fan disk insert 460 can retain a single fan blade 140, which reduces the number of fan disk inserts 460 needed (e.g., two) to retain each fan blade 140. Use of a single fan disk insert 160 to retain each fan blade 140 can facilitate the sliding contact between the side surfaces 472 and 474 and promote rigid body motion during a fan blade out event.

Figure 5:
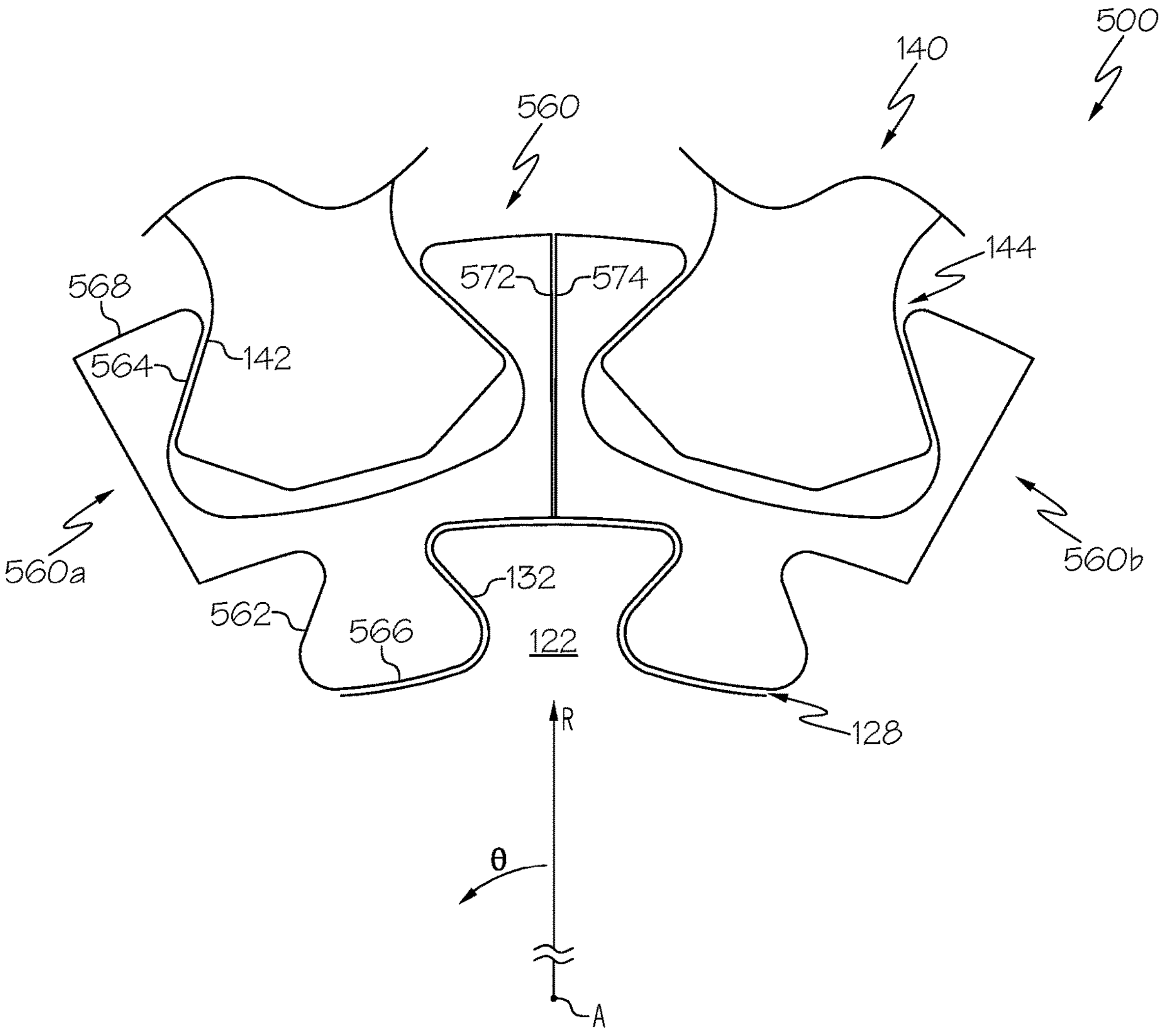
FIG. 5 schematically depicts a partial cross section of yet another fan assembly taken normal to the axial direction, according to one or more embodiments shown and described herein.

Referring now to FIG. 5, an embodiment of a fan assembly 500 is schematically depicted. The fan assembly 500 is substantially similar to the fan assemblies 100, 200, 300, and 400. Accordingly, like numbers will be used to refer to like features. For example, the fan assembly 500 may include a fan disk 120 that may include disk posts 122 radially extending from a central region 128. The fan assembly 500 may include fan blades 140. Each of the fan blades 140 may be circumferentially offset from the disk posts 122 (e.g. in the +/−θ direction of the depicted cylindrical coordinate system). The disk posts 122 may have disk post pressure surfaces 132 such as described hereinabove. The fan blades 140 may have fan blade pressure surfaces 142 such as described hereinabove.

The fan assembly 500 may include fan disk inserts 560, such as a first fan disk insert 560*a* and a second fan disk insert 560*b*. The fan disk inserts 560 may be circumferentially aligned with the fan blades 140, such as depicted. The fan disk inserts 560 may extend from a radially inner surface 566 to a radially outer surface 568. The fan disk inserts 560 may have a first side surface 572 and a second side surface 574, each extending radially inward from the radially outer surface 568. When the fan assembly 500 is assembled, the first side surface 572 of the first fan disk insert 560*a* may be in slidable contact with the second side surface 574 of the second fan disk insert 560*b*.

Still referring to FIG. 5, the fan disk inserts 560 may include outer pressure surfaces 564 and inner pressure surfaces 562. Each of the inner pressure surfaces 562 and the outer pressure surfaces 564 may be oriented at an angle to the radial direction R. In particular, the inner pressure surfaces 562 may be oriented at the same angle as the disk post pressure surfaces 132. The outer pressure surfaces 564 may be oriented at the same angle as the fan blade pressure surfaces 142. In this way, the inner pressure surfaces 562 may be engage the disk post pressure surfaces 132 when assembled within the fan assembly 500, and the outer pressure surfaces 564 may engage the fan blade pressure surfaces 142 when assembled within the fan assembly 500.

Each of the outer pressure surfaces 564 and the inner pressure surfaces 562 may be disposed between the radially inner surface 566 and the radially outer surface 568. In particular, the outer pressure surfaces 564 may extend radially inward from the radially outer surface 568. Accordingly, the outer pressure surfaces 564 may define concave shapes within the fan disk inserts 560. The inner pressure surfaces 562 may be disposed between the radially inner surface 566 and first side surface 572 and the second side surface 574. Accordingly, the inner pressure surfaces 562 may form dovetail-shaped geometries at the radially inner surface 566. When the fan assembly 500 is assembled, the outer pressure surfaces 564 may engage and be in slidable contact with the fan blade pressure surfaces 142. The inner pressure surfaces 562 may engage and be in slidable contact with the disk post pressure surfaces 132.

In light of FIG. 5, during a fan blade out event, the fan disk inserts 560 may rotate circumferentially (e.g. in the +/−θ direction of the depicted cylindrical coordinate system). In particular, the fan disk inserts 560 may rotate in accordance with rigid body motion due to the slidable contact between the inner pressure surfaces 562 and the disk post pressure surfaces 132, between the outer pressure surfaces 564 and the fan blade pressure surfaces 142, and between the first side surface 572 of a first fan disk insert 560*a* and the second side surface 574 of a second fan disk insert 560*b*. The rigid body motion of the fan disk inserts 460 may decrease bending stresses throughout the fan assembly 500. As a result, the radial positions of the disk posts 122 and the dovetail region 144 of the fan blades 140 may be reduced compared to conventional fan disk designs having more extended radial positions of the disk posts and dovetail regions. This may increase the overall efficiency of the fan assembly 500 and, more broadly, the engine in which the fan assembly 500 is included.

Figure 6:
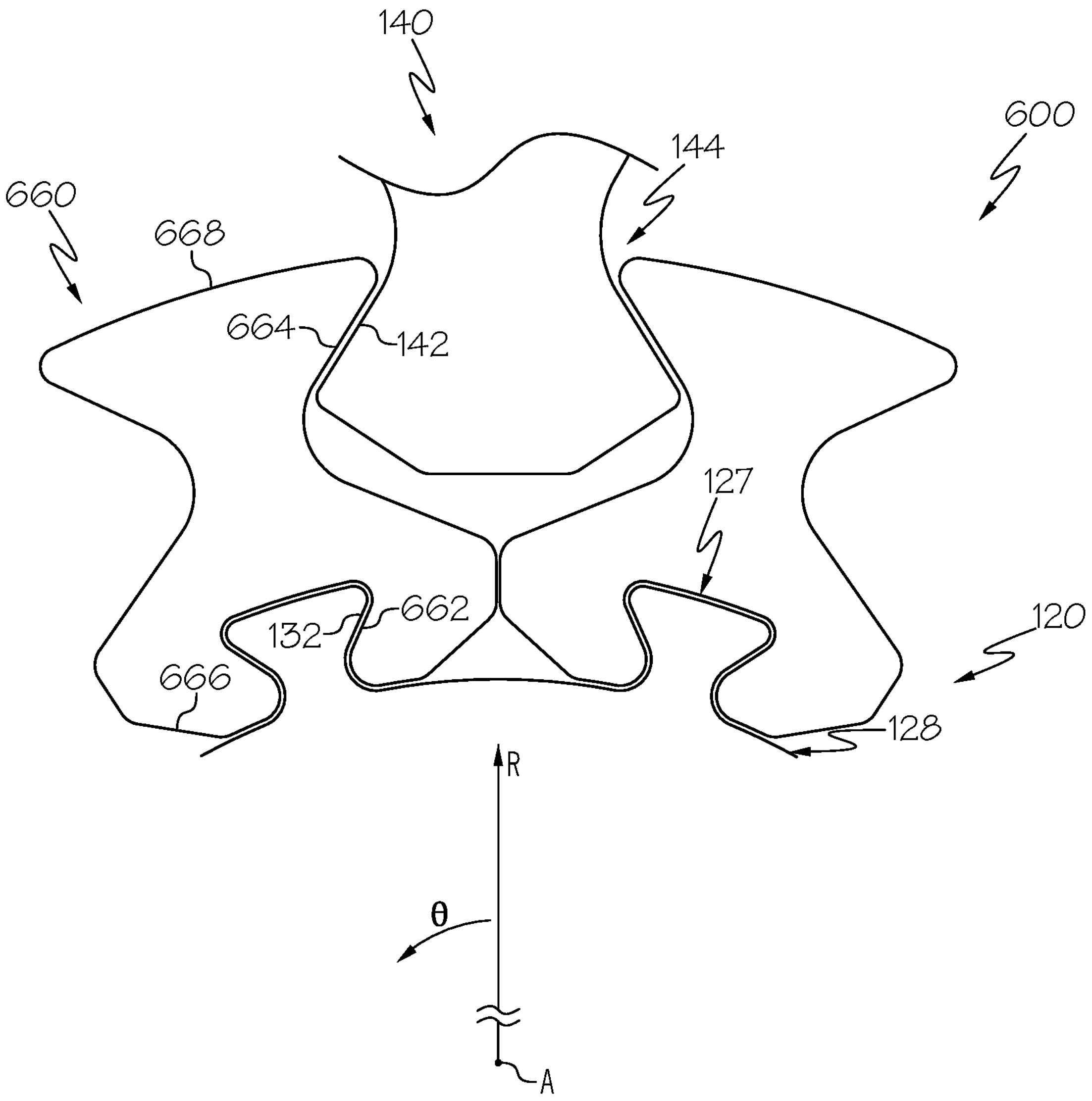
FIG. 6 schematically depicts a partial cross section of yet another fan assembly taken normal to the axial direction, according to one or more embodiments shown and described herein.

Referring now to FIG. 6, an embodiment of a fan assembly 600 is schematically depicted. The fan assembly 600 is similar to the fan assemblies 100, 200, 300, 400, and 500. Accordingly, like numbers will be used to refer to like features. For example, the fan assembly 600 may include a fan disk 120 that may include disk posts 122 radially extending from a central region 128. The fan assembly 600 may include fan blades 140. Each of the fan blades 140 may be circumferentially offset from the disk posts 122 (e.g. in the +/−θ direction of the depicted cylindrical coordinate system). The disk posts 122 may have disk post pressure surfaces 132 such as described hereinabove. The fan blades 140 may have fan blade pressure surfaces 142 such as described hereinabove.

The fan assembly 600 may include fan disk inserts 660. The fan disk inserts 660 may be circumferentially aligned with the fan blades 140, such as depicted. The fan disk inserts 660 may extend from a radially inner surface 666 to a radially outer surface 668. The fan disk inserts 660 may include outer pressure surfaces 664 and inner pressure surfaces 662. Each of the inner pressure surfaces 662 and the outer pressure surfaces 664 may be oriented at an angle to the radial direction R. In particular, the inner pressure surfaces 662 may be oriented at the same angle as the disk post pressure surfaces 132. The outer pressure surfaces 664 may be oriented at the same angle as the fan blade pressure surfaces 142. In this way, the inner pressure surfaces 662 may engage the disk post pressure surfaces 132 when assembled within the fan assembly 600, and the outer pressure surfaces 664 may engage the fan blade pressure surfaces 142 when assembled within the fan assembly 600. The inner pressure surfaces 662 may extend radially inward form the radially inner surface 666. Accordingly, the fan disk inserts 660 may have a hourglass cross sectional shape with the inner pressure surfaces 662 forming a concave shape at the radially inner surface 666.

In light of FIG. 6, during a fan blade out event, the fan disk inserts 660 may rotate circumferentially (e.g. in the +/−θ direction of the depicted cylindrical coordinate system). In particular, the fan disk inserts 660 may rotate in accordance with rigid body motion due to the slidable contact between the inner pressure surfaces 662 and the disk post pressure surfaces 132 and between the outer pressure surfaces 664 and the fan blade pressure surfaces 142. The rigid body motion of the fan disk inserts 660 may decrease bending stresses throughout the fan assembly 600. As a result, the radial positions of the disk posts 122, the fan disk inserts 660, and the dovetail region 144 of the fan blades 140 may be decreased as compared to conventional fan disk designs. This may increase the overall efficiency of the fan assembly 600 and, more broadly, the engine in which the fan assembly 600 is included.

Figure 7:
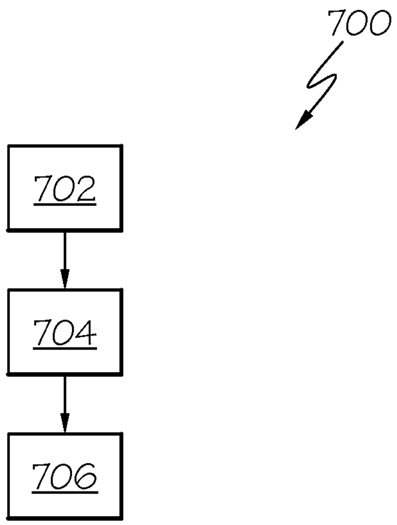
FIG. 7 depicts a method of assembling a fan assembly, according to one or more embodiments shown and described herein.

Referring to FIG. 7, a method 700 of assembling a fan assembly is shown. At step 702, the method includes inserting fan disk inserts into a fan disk. The fan disk inserts may be inserted within dovetail recesses between adjacent disk posts as described above. At step 704, fan blades may be inserted into an array of dovetail recesses formed between or by the fan disk inserts. In some embodiments, as step 706 spacers may be provided within the dovetail recesses between the disk posts and/or between the disk post inserts. The method can apply to any of turbine and compressor assemblies.

In view of the above, it should now be understood that at least some embodiments of the present disclosure are directed to a fan assembly for an engine. The fan assembly includes a fan disk, fan disk inserts, and fan blades. The fan disk includes disk posts extending in a radial direction from a central region of the fan disk. The disk posts include disk post pressure surfaces that define a first array of dovetail recesses. The fan disk inserts are retained within the first array of dovetail recesses. The fan disk inserts include fan disk insert pressure surfaces that define a second array of dovetail recesses. The fan blades are retained within the second array of dovetail recesses.

The above-described rotor disks (e.g., for fan assemblies, turbine assemblies and/or compressor assemblies) include disk posts and disk post inserts as insert means that can be assembled into dovetail slots formed near to the plurality of disk posts. The disk post inserts can have a degree of freedom of rotation that can enable the disk post to undergo rigid body motion until equilibrium is attained without undergoing plastic deformation at the disk post neck region. Currently, disk posts need to plastically deform to attain equilibrium. The blade dovetails and disk posts may be formed of a composite, such as a metal alloy (e.g., titanium alloy) and the disk post inserts may be formed of a composite material that includes a different material not in the blade dovetails and disk post inserts such as a shape memory alloy. Spacers may be used underneath the blade dovetails to further support the blade dovetails due to entry of foreign objects into the engine.

Further aspects of the present disclosure are provided by the subject matter of the following clauses:

Clause 1: A rotor disk for a gas turbine engine, the rotor disk comprising: a disk body comprising disk posts extending in a radial direction from a central region of the disk body, the disk posts comprising disk post pressure surfaces that define a first array of dovetail recesses; disk inserts retained within the first array of dovetail recesses, the disk inserts comprising disk insert pressure surfaces that define a second array of dovetail recesses; and blades retained within the second array of dovetail recesses.

Clause 2: The rotor disk of any of the above clauses, wherein the blades are circumferentially aligned with the disk posts.

Clause 3: The rotor disk of any of the above clauses, wherein the disk insert pressure surfaces of the disk inserts comprise outer pressure surfaces and inner pressure surfaces, wherein the disk inserts comprise a neck disposed between the outer pressure surfaces and the inner pressure surfaces.

Clause 4: The rotor disk of any of the above clauses, wherein the disk inserts comprise a first material and the disk posts comprise a second material different from the first material.

Clause 5: The rotor disk of any of the above clauses, wherein the disk inserts comprise an outer dovetail portion and an inner dovetail portion that are connected by a disk insert neck of reduced circumferential dimension compared to the outer and inner dovetail portions.

Clause 6: The rotor disk of any of the above clauses, wherein the disk inserts comprise a first disk insert and a second disk insert in slidable contact with the first disk insert.

Clause 7: The rotor disk of any of the above clauses, wherein: the first disk insert comprises a first side surface; the second disk insert comprises a second side surface; and the first side surface is in slidable contact with the second side surface.

Clause 8: The rotor disk of any of the above clauses, wherein the first side surface and the second side surface are aligned with the radial direction.

Clause 9: The rotor disk of any of the above clauses, wherein the disk body is made from a first material and the disk inserts are made from a second material different from the first material.

Clause 10: The rotor disk of any of clauses 1-5 or 9, wherein the disk insert pressure surfaces of the disk inserts comprise outer pressure surfaces and inner pressure surfaces, wherein the outer pressure surfaces define a concave shape within the fan disk inserts.

Clause 11: The rotor disk of any of the above clauses, wherein the disk insert pressure surfaces of the disk inserts comprise outer pressure surfaces and inner pressure surfaces, wherein the inner pressure surfaces define a concave shape within the disk inserts.

Clause 12: The rotor disk of any of the above clauses, further comprising a spacer disposed between the blades and the disk posts.

Clause 13: The rotor disk of any of the above clauses, further comprising a spacer disposed between the disk inserts and the central region of the disk body.

Clause 14: The rotor disk of any of the above clauses, wherein the disk inserts are configured to move in the dovetail recesses during a fan blade out event.

Clause 15: A fan assembly for an engine comprising: a fan disk comprising disk posts extending in a radial direction from a central region the fan disk, each of the disk posts comprising disk post pressure surfaces; fan disk inserts retained by the disk post pressure surfaces and in slidable contact with the disk post pressure surfaces, each of the fan disk inserts comprising fan disk insert pressure surfaces; and fan blades retained by the fan disk insert pressure surfaces and in slidable contact with the fan disk insert pressure surfaces.

Clause 16: The fan assembly of any of the above clauses, wherein said each of the disk posts comprises a radially outer surface having a concave shape.

Clause 17: The fan assembly of any of the above clauses, wherein said each of the fan disk inserts comprises a radially outer surface having a concave shape.

Clause 18: The fan assembly of any of the above clauses, wherein said each of the fan disk inserts comprises a radially inner surface having a concave shape.

Clause 19: A rotor disk for a gas turbine engine, the rotor disk comprising: rotational support means comprising disk posts extending in a radial direction, the disk posts comprising disk post pressure surfaces that define a first array of dovetail recesses; and insert means for retaining blades within a second array of dovetail recesses.

Clause 20: The rotor disk of any of the above clauses, wherein the insert means comprises disk inserts retained within the first array of dovetail recesses, the disk inserts defining the second array of dovetail recesses.

Clause 21: A method of assembling a fan assembly comprising: inserting fan disk inserts into a fan disk; and inserting fan blades into the fan disk inserts, wherein: the fan disk comprises disk posts extending in a radial direction from a central region the fan disk, each of the disk posts comprising disk post pressure surfaces; the fan disk inserts are retained by the disk post pressure surfaces, each of the fan disk inserts comprising fan disk insert pressure surfaces; and the fan blades are retained by the fan disk insert pressure surfaces.

Clause 22: The method of any of the above clauses further comprising inserting a spacer between the fan blades and the disk posts.

Clause 23: The method of any of the above clauses further comprising inserting a spacer disposed between the fan disk inserts and the central region of the fan disk.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A rotor disk for a gas turbine engine, the rotor disk comprising:

a disk body comprising disk posts extending in a radial direction from a central region of the disk body, the disk posts comprising disk post pressure surfaces that define a first array of dovetail recesses;

disk inserts retained within the first array of dovetail recesses, the disk inserts comprising disk insert pressure surfaces that define a second array of dovetail recesses; and blades retained within the second array of dovetail recesses;

wherein the disk inserts each comprise an outer dovetail portion that includes an outer pair of the disk insert pressure surfaces and an inner dovetail portion that includes an inner pair of the disk insert pressure surfaces, the outer dovetail portion and the inner dovetail portion connected by a disk insert neck of reduced circumferential dimension compared to the outer and inner dovetail portions;

wherein the inner dovetail portion and disk insert neck of each disk insert are configured such that centrifugal force acting on the rotor disk during operation of the rotor disk moves each disk insert to a radially outermost position providing a disk insert gap between each disk insert and a central region of the disk body and the disk post pressure surfaces and the disk insert pressure surfaces are configured such that the disk insert neck from the inner dovetail portion to the outer dovetail portion is located entirely radially outside the respective one of the first array of dovetail recesses with the disk inserts in the radially outermost position, where, in the radially outermost position, the disk insert pressure surfaces are positioned such that a radial offset is provided between each disk post and each blade opening a blade gap between each disk post and each blade due to the centrifugal force.

2. The rotor disk of claim 1, wherein the blades are circumferentially aligned with the disk posts.

3. The rotor disk of claim 1, wherein the disk inserts comprise a first material and the disk posts comprise a second material different from the first material.

4. The rotor disk of claim 1, wherein the disk inserts comprise a first disk insert and a second disk insert in slidable contact with the first disk insert.

5. The rotor disk of claim 4, wherein:

the first disk insert comprises a first side surface;

the second disk insert comprises a second side surface; and the first side surface is in slidable contact with the second side surface.

6. The rotor disk of claim 5, wherein the first side surface and the second side surface are aligned with the radial direction.

7. The rotor disk of claim 1, wherein the disk body is made from a first material and the disk inserts are made from a second material different from the first material.

8. The rotor disk of claim 1, wherein the disk insert pressure surfaces of the disk inserts comprise outer pressure surfaces and inner pressure surfaces, wherein the outer pressure surfaces define a concave shape within the disk inserts.

9. The rotor disk of claim 1, wherein the disk insert pressure surfaces of the disk inserts comprise outer pressure surfaces and inner pressure surfaces, wherein the inner pressure surfaces define a concave shape within the disk inserts.

10. The rotor disk of claim 1, wherein the disk inserts are configured to move in the dovetail recesses during a fan blade out event.

11. A rotor disk for a gas turbine engine, the rotor disk comprising:

rotational support means comprising disk posts extending in a radial direction, the disk posts comprising disk post pressure surfaces that define a first array of dovetail recesses; and insert means for retaining blades within a second array of dovetail recesses;

wherein the insert means comprises disk inserts retained within the first array of dovetail recesses, the disk inserts defining the second array of dovetail recesses;

wherein the disk inserts each comprise an outer dovetail portion that includes an outer pair of the disk insert pressure surfaces and an inner dovetail portion that includes an inner pair of the disk insert pressure surfaces, the outer dovetail portion and the inner dovetail portion connected by a disk insert neck of reduced circumferential dimension compared to the outer and inner dovetail portions, wherein the inner dovetail portion and disk insert neck of each disk insert being are configured such that centrifugal force acting on the rotor disk during operation of the rotor disk moves each disk insert to a radially outermost position providing a disk insert gap between each disk insert and a central region of the disk body and the disk post pressure surfaces and the disk insert pressure surfaces are configured such that the disk insert neck from the inner dovetail portion to the outer dovetail portion is located entirely radially outside the respective one of the first array of dovetail recesses with the disk inserts in the radially outermost position, where, in the radially outermost position, the disk insert pressure surfaces are positioned such that a radial offset is provided between each disk post and each blade opening a blade gap between each disk post and each blade due to the centrifugal force.

12. The rotor disk of claim 11, wherein the disk inserts comprise a first material and the disk posts comprise a second material different from the first material.

* * * * *